United States Patent
Reddy A. V. et al.

(10) Patent No.: US 11,093,346 B2
(45) Date of Patent: Aug. 17, 2021

(54) UNINTERRUPTED BACKUP OPERATION USING A TIME BASED APPROACH

(71) Applicant: EMC IP Holding Company LLC, Hopkinton, MA (US)

(72) Inventors: Mahesh Reddy A. V., Bangalore (IN); Swaroop Shankar DH, Bangalore (IN); Mahantesh Ambaljeri, Bangalore (IN); Chetan Battal, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 38 days.

(21) Appl. No.: 16/429,178

(22) Filed: Jun. 3, 2019

(65) Prior Publication Data

US 2020/0379850 A1    Dec. 3, 2020

(51) Int. Cl.
*G06F 12/00* (2006.01)
*G06F 13/00* (2006.01)
*G06F 11/14* (2006.01)
*H04L 12/24* (2006.01)

(52) U.S. Cl.
CPC ...... *G06F 11/1464* (2013.01); *G06F 11/1466* (2013.01); *G06F 11/1469* (2013.01); *H04L 41/046* (2013.01)

(58) Field of Classification Search
CPC ............. G06F 11/1464; G06F 11/1466; G06F 11/1469; H04L 41/046
USPC ........................................................ 711/162
See application file for complete search history.

(56) References Cited

U.S. PATENT DOCUMENTS

| | | | | |
|---|---|---|---|---|
| 5,388,261 A | * | 2/1995 | Anderson | G06F 9/4881 715/201 |
| 5,581,748 A | * | 12/1996 | Anderson | G06F 9/52 375/357 |
| 5,628,013 A | * | 5/1997 | Anderson | G06F 9/4887 718/107 |
| 8,130,664 B2 | * | 3/2012 | Connors | H04W 36/02 370/252 |
| 8,131,681 B1 | * | 3/2012 | Hangud | G06F 11/1469 707/654 |
| 8,694,352 B1 | * | 4/2014 | Hawkins | G06Q 10/06 705/7.15 |
| 8,914,329 B1 | * | 12/2014 | Chandra | G06F 11/263 707/654 |
| 8,924,355 B1 | * | 12/2014 | Kundzich | G06F 11/1458 707/647 |
| 9,354,813 B1 | * | 5/2016 | Dolan | G06F 3/0647 |
| 2004/0098423 A1 | * | 5/2004 | Chigusa | G06F 11/1461 |

(Continued)

*Primary Examiner* — Sheng Jen Tsai
(74) *Attorney, Agent, or Firm* — Womble Bond Dickinson (US) LLP (57) ABSTRACT

An apparatus for performing backup operations for data packets by a backup agent is provided. The apparatus predicts a first backup time period of completing a first backup operation for the data packets and determines a second backup time period of performing the first backup operation until the first backup operation is stopped at a point of time. The apparatus also identifies an incomplete status of the first backup operation at the point of time based on a comparison between the first backup time period and the second backup time period, and collects information describing the incomplete status. The apparatus further starts a second backup operation for the data packets from the incomplete status based on the information.

20 Claims, 6 Drawing Sheets

(56) References Cited

U.S. PATENT DOCUMENTS

| | | | |
|---|---|---|---|
| 2007/0133448 A1* | 6/2007 | Gao | H04W 52/0216 370/311 |
| 2009/0125577 A1* | 5/2009 | Kodama | G06F 11/1458 709/201 |
| 2009/0168790 A1* | 7/2009 | Lee | H04L 47/527 370/412 |
| 2009/0193235 A1* | 7/2009 | Hayashi | G06Q 10/06 712/225 |
| 2009/0300633 A1* | 12/2009 | Altrichter | G06F 9/4856 718/103 |
| 2009/0316873 A1* | 12/2009 | Lewis | H04M 3/5175 379/202.01 |
| 2010/0165872 A1* | 7/2010 | Jiang | H04L 49/90 370/253 |
| 2011/0078494 A1* | 3/2011 | Maki | G06F 11/2071 714/6.12 |
| 2011/0183433 A1* | 7/2011 | Motadel | B01L 3/0279 436/180 |
| 2012/0233419 A1* | 9/2012 | Yamashita | G06F 11/1461 711/162 |
| 2014/0092757 A1* | 4/2014 | Xu | G06F 11/1461 370/252 |
| 2014/0181282 A1* | 6/2014 | Llorca | H04L 67/2852 709/223 |
| 2016/0266808 A1* | 9/2016 | Yamaguchi | G06F 3/0689 |
| 2017/0206107 A1* | 7/2017 | Guha | G06F 3/0647 |

* cited by examiner

UNINTERRUPTED BACKUP OPERATION USING A TIME BASED APPROACH

TECHNOLOGICAL FIELD

The present disclosure relates generally to backup operations, and in particular, to uninterrupted backup operations using a time based approach.

BACKGROUND

In a backup operation, data packets may be in a queue for write operations to a target device to back up the data packets in the target device. However, unexpected events may interrupt the backup operation during the implementation of the backup operation. The interruption may cause the backup operation to stop or abort before the backup operation is successfully completed. The backup system may not provide a solution to identify the interruption or the status of the backup operation at the interruption. Thus, the interruption may cause the backup operation to stop completely. In this situation, the next backup operation may start over from the beginning of the queue resulting in an overhead in the backup window. Also, in the next backup operation, the backed up data packets from the beginning of the queue to the position in the queue where the interruption occurs may be already stale and not qualified for future restoration.

Therefore, it would be desirable to have a system and method that takes into account at least some of the issues discussed above, as well as other possible issues.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Example implementations of the present disclosure can utilize a time based approach to identify an incomplete status of a backup operation stopped at a point of time due to an unexpected interruption. Example implementations of the present disclosure can collect information describing the incomplete status of the backup operation. Example implementations of the present disclosure can also provide an uninterrupted successive backup operation starting from the incomplete status of the previous backup operation based on the collected information. Comparing to conventional solutions, example implementations of the present disclosure can mitigate the overhead of starting over the backup operation from the beginning of the queue of the data packets. That is, the next backup operation can start from the position in the queue where the interruption occurs to avoid increasing the backup window. Also, data packets already backed up at the incomplete status may be qualified for future restoration.

The present disclosure thus includes, without limitation, the following example implementations.

Some example implementations provide a method of performing backup operations for data packets by a backup agent. The method comprises: predicting a first backup time period of completing a first backup operation for the data packets; determining a second backup time period of performing the first backup operation until the first backup operation is stopped at a point of time; identifying an incomplete status of the first backup operation at the point of time based on a comparison between the first backup time period and the second backup time period; collecting information describing the incomplete status; and starting a second backup operation for the data packets from the incomplete status based on the information.

In some example implementations of the method of any preceding example implementation, or any combination of preceding example implementations, predicting the first backup time period includes predicting the first backup time period based on a difference between an average arrival time of the data packets and an average completion time of completing the first backup operation for the data packets.

In some example implementations of the method of any preceding example implementation, or any combination of preceding example implementations, determining the second backup time period includes determining the second backup time period based on a difference between the average arrival time and the point of time.

In some example implementations of the method of any preceding example implementation, or any combination of preceding example implementations, the first backup operation is stopped at the point of time in response to a signal received by the backup agent.

In some example implementations of the method of any preceding example implementation, or any combination of preceding example implementations, determining the second backup time period includes monitoring the first backup operation at regular time intervals to detect the signal.

In some example implementations of the method of any preceding example implementation, or any combination of preceding example implementations, identifying the incomplete status of the first backup operation includes identifying the incomplete status of the first backup operation when the second backup time period is shorter than the first backup time period.

In some example implementations of the method of any preceding example implementation, or any combination of preceding example implementations, the information describing the incomplete status is stored in a cache memory.

Some example implementations provide an apparatus for performing backup operations for data packets by a backup agent. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for performing backup operations for data packets by a backup agent. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to backup operations, and in particular, to uninterrupted backup operations using a time based approach.

Figure 1:
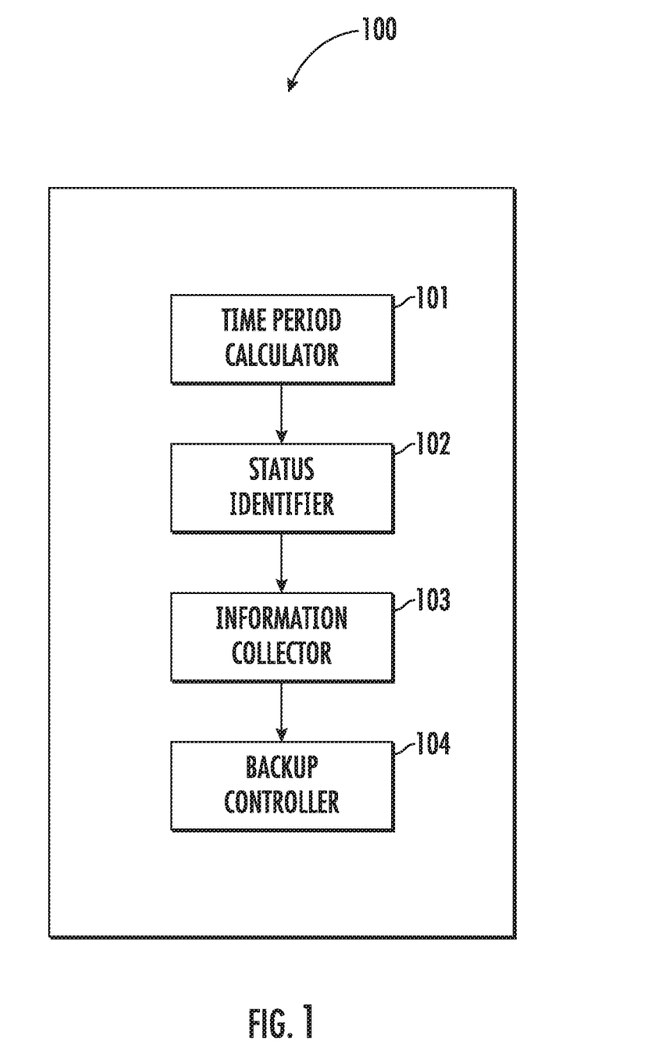
FIG. 1 illustrates a system for performing backup operations for data packets by a backup agent, according to example implementations of the present disclosure.

FIG. 1 illustrates a system 100 for performing backup operations for data packets, according to example implementations of the present disclosure. In some implementations, as described in greater detail with reference to FIG. 5, the system may be implemented by an apparatus that includes a processor and a memory storing executable instructions.

As shown, the system 100 includes any of a number of different subsystems (each an individual system) for performing one or more functions or operations. As shown, in some examples, the system includes one or more of each of time period calculator 101, a status identifier 102, an information collector 103 and a backup controller 104. The subsystems may be co-located or directly coupled to one another, or in some examples, various ones of the subsystems may communicate with one another across one or more computer networks. Further, although shown as part of the system, it should be understood that any one or more of the time period calculator, status identifier, information collector or backup controller may function or operate as a separate system without regard to any of the other subsystems. It should also be understood that the system may include one or more additional or alternative subsystems than those shown in FIG. 1. In one implementation, the system 100 is a backup agent. The backup agent 100 may be in a client device or in a server. The client device or server may be in a cloud environment.

In some implementations, the time period calculator 101 is configured to predict a first backup time period of completing a first backup operation for the data packets. In these implementations, the time period calculator is configured to predict the first backup time period based on a difference between an average arrival time of the data packets and an average completion time of completing the first backup operation for the data packets. The time period calculator can calculate the average arrival time of the data packets and the average completion time of completing the first backup operation to predict the first backup time period, as described in greater details with reference to FIG. 2A below.

In some implementations, the time period calculator 101 is also configured to determine a second backup time period of performing the first backup operation until the first backup operation is stopped at a point of time. In these implementations, the time period calculator is configured to determine the second backup time period based on a difference between the average arrival time of the data packets and the point of time. The time period calculator can calculate the second backup time period, as described in greater details with reference to FIG. 2B below.

In some implementations, the first backup operation is stopped at the point of time in response to a signal received by the backup agent 100. For example, the signal may be an unexpected termination signal. In these implementations, to determine the second backup time period, the time period calculator 101 is configured to monitor the first backup operation at regular time intervals to detect the signal.

The time period calculator 101 can provide the first backup time period and the second backup time period to the status identifier 102. In some implementations, the status identifier is configured to identify an incomplete status of the first backup operation at the point of time based on a comparison between the first backup time period and the second backup time period. In these implementations, the status identifier is configured to identify the incomplete status of the first backup operation when the second backup time period is shorter than the first backup time period.

The status identifier 102 can notify the information collector 103 the identified incomplete status of the first backup operation. In some implementations, the information collector is configured to collect information describing the incomplete status. In these implementations, the information describing the incomplete status is stored in a cache memory such as in a level-1 (L1) or level-2 (L2) cache memory.

The information collector 103 can provide the collected information describing the incomplete status to the backup controller 104. In some implementations, the backup controller is configured to start a second backup operation for the data packets from the incomplete status based on the information. The second backup operation may be the next or the successive backup operation after the first backup operation. In one example, the second backup operation does not start over from the beginning of the queue of the data packets.

Figure 2A:
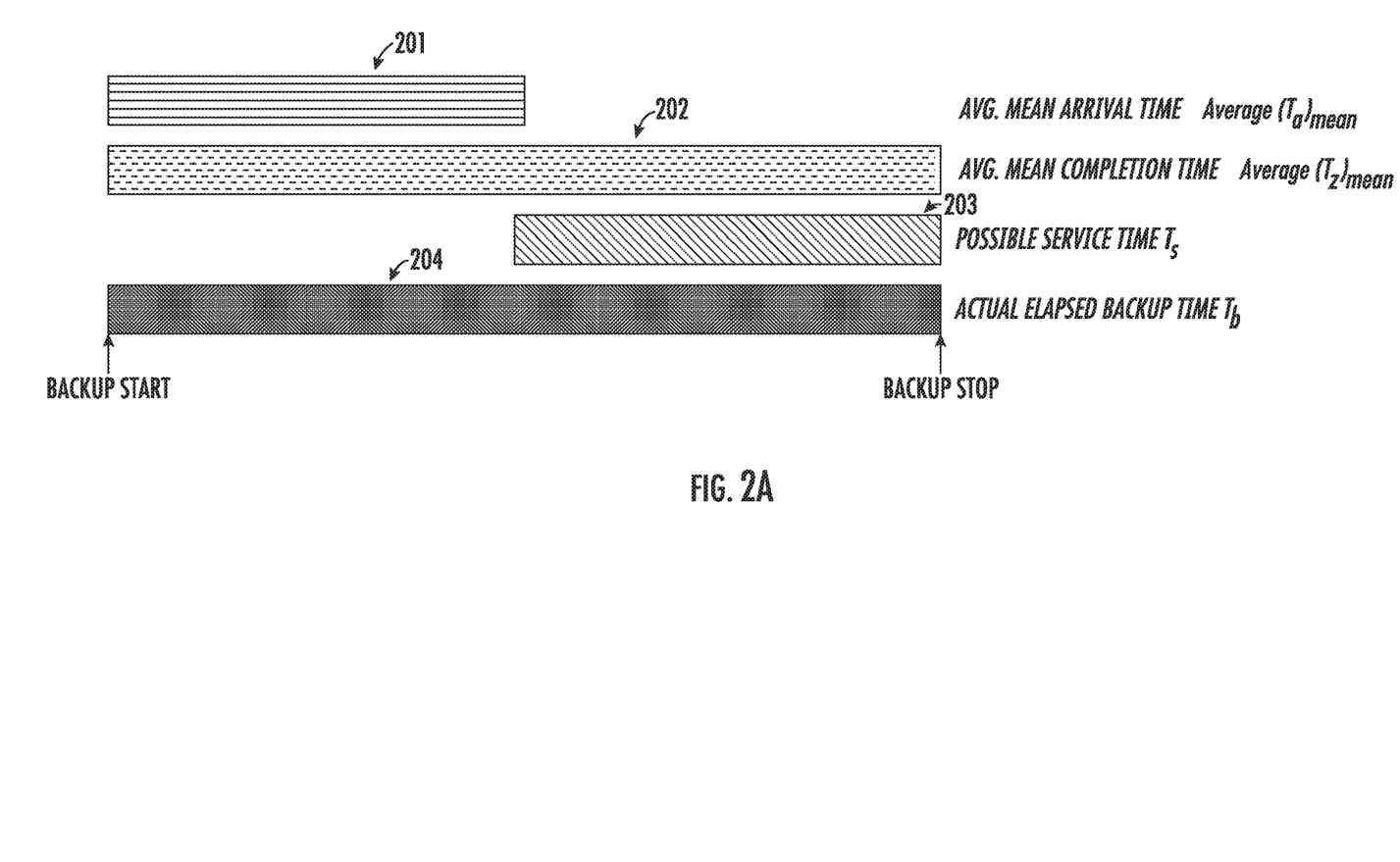
FIGS. 2A and 2B respectively illustrate calculating a first backup time period of completing a first backup operation and calculating a second backup time period of performing the first backup operation, according to example implementations of the present disclosure.

FIG. 2A illustrates calculating a first backup time period of completing a first backup operation using a time based approach, according to example implementations of the present disclosure. As shown in FIG. 2A, block 201 may represent the average arrival time of the data packets in a first backup operation. In one example, the data packets can be represented as a set $X=\{x_0, x_1, \ldots, x_n\}$. Arrival times of the data packets can be represented as $T_a=\{t_0, t_1, \ldots, t_n\}$. In one example, the time period calculator 101 can calculate the average arrival time of the data packets at any instant of time by the following equation:

$$\text{Average}(T_Z)_{mean} = \int_{t_x}^{t_{x+k}} \frac{1}{n} \sum_{i=1}^{n} (Z_i - (t_d + q_d)) \, dt \qquad (2)$$

$$\text{where,} \begin{cases} i, n \in \text{Natural number} \\ \text{suffix '}d\text{' denotes time delay unit} \\ x, k \in \text{positive decimals representing time} \end{cases}$$

where $t_0$ is the arrival time of the first data packet $x_0$ and $t_j$ is the current arrival time instant.

In one example, once the averaged arrival time of the data packets Average $(T_a)_{mean}$ is calculated using equation (1), the write operations may be latched for the n data packets at a target device. In one example, the time for data packets to be latched for write operations can be represented as $Z=\{Z_1, Z_2, \ldots, Z_n\}$. The time period calculator 101 can calculate an expected average completion time (denoted by block 202 in FIG. 2A) of completing the first backup operation for the data packets by the following equation:

$$\text{Average}(T_a)_{mean} = \int_{t_0}^{t_j} \frac{1}{n} \sum_{i=1}^{n} x_i t_i \, dt \text{ where,} \begin{cases} n, i, j \in \text{Natural number} \\ t_0 \text{ is the arrival time} \end{cases} \qquad (1)$$

where the lower limit $t_x$ of the integral can be the time at which the data packets are initiated to start the first backup operation, and the upper limit $t_{x+k}$ of the integral can be the incremental time period calculated based on the available network bandwidth and the size of data packets to be written to the target device, which may indicate the possible backup completion time. Once the expected average completion time is calculated, the write operation may have started concurrently. In one example, while calculating the expected average completion time, certain delays may be considered to more accurately calculate the expected average completion time. In one example, $t_d$ can be the transmission delay from the write ports to the write latch at the target device, and $q_d$ can be the delay due to the wait time at the write ports per data packet for an available write latch.

In one example, once the averaged arrival time of the data packets Average $(T_a)_{mean}$ and the expected average completion time Average $(T_Z)_{mean}$ are calculated, the predicted backup service time $T_s$ (denoted by block 203 in FIG. 2A) can be calculated based on the difference between Average $(T_a)_{mean}$ and Average$(T_Z)_{mean}$. For example, $T_s$=Average $(T_Z)_{mean}$−Average$(T_a)_{mean}$. The predicted backup service time $T_s$ may correspond to the first backup time period described above with reference FIG. 1. The predicted backup service time $T_s$ may indicate the expected or possible time period needed to perform the first backup operation until the first backup operation is successfully completed.

In one example, block 204 in FIG. 2A indicates the actual elapsed time period $T_b$ from the start of the first backup operation until the stop of the first backup operation. In the example as shown in FIG. 2A, $T_b$−Average$(T_a)_{mean}$=$T_s$, which may indicate that the actual backup service time $T_b$−Average$(T_a)_{mean}$ is equal to the predicted backup service time $T_s$ needed to successfully complete the first backup operation. That is, when $T_b$−Average$(T_a)_{mean}$=$T_s$, it may indicate that the first backup operation is successfully completed. On the other hand, if $T_b$−Average$(T_a)_{mean}$≠$T_s$, it may indicate that the first backup operation is not successfully completed.

Figure 2B:
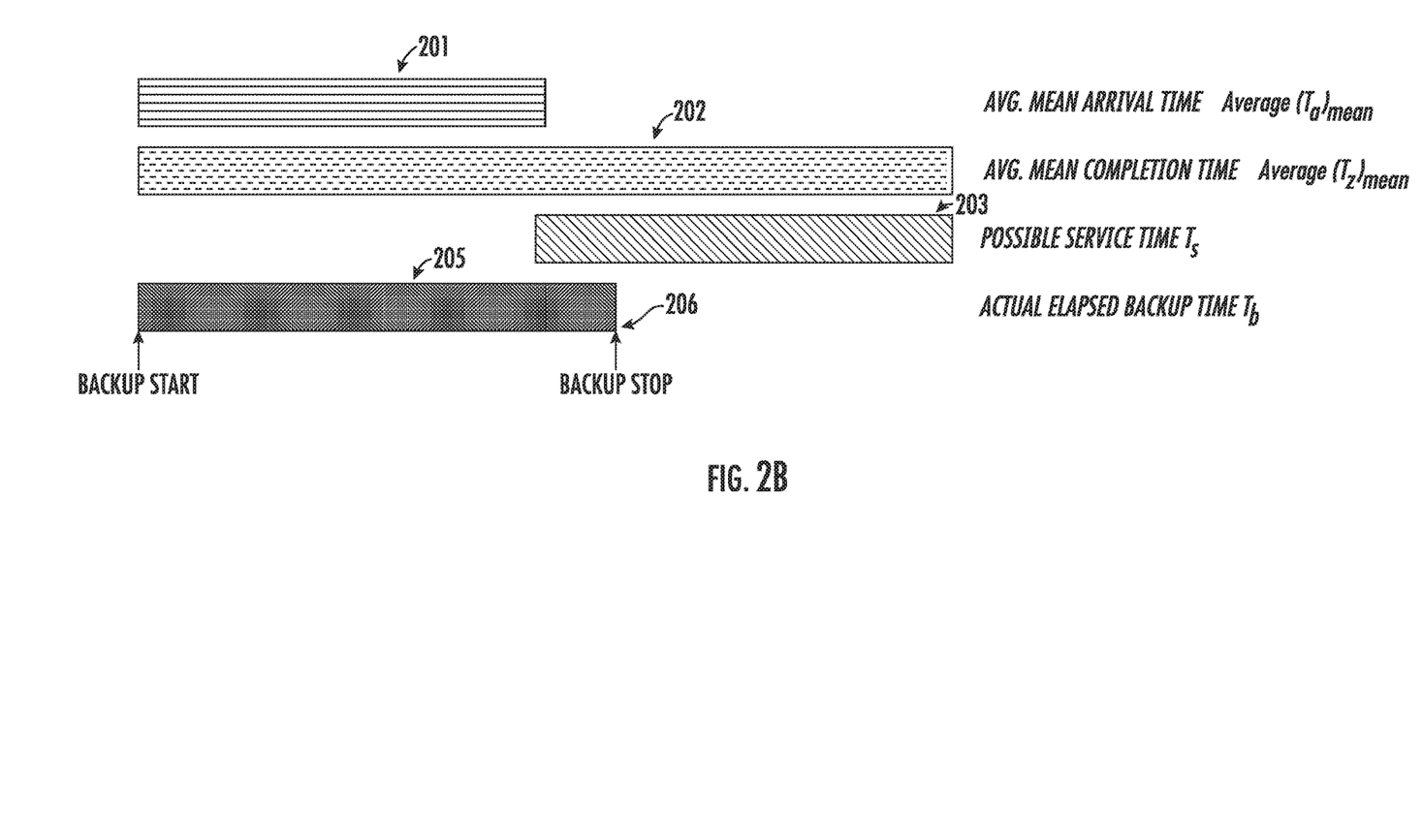

FIG. 2B illustrates calculating a second backup time period of performing the first backup operation using a time based approach, according to example implementations of the present disclosure. Similarly as in FIG. 2A, in FIG. 2B, block 201 denotes the averaged arrival time of the data packets Average$(T_a)_{mean}$, block 202 denotes the expected average completion time Average$(T_Z)_{mean}$, and block 203 denotes the predicted backup service time $T_s$. In one example, block 205 in FIG. 2B indicates the actual elapsed time period $T_b$ from the start of the first backup operation until the first backup operation is stopped at a point of time 206. In this example, $T_b$−Average$(T_a)_{mean}$≠$T_s$, which may indicate that the first backup operation is not successfully completed at the point of time 206. $T_b$−Average$(T_a)_{mean}$ in FIG. 2B may correspond to the second backup time period described above with reference FIG. 1.

In one example, the status identifier 102 can identify an incomplete status of the first backup operation at the point of time 206 based on a comparison between the predicted backup service time $T_s$ and $T_b$−Average$(T_a)_{mean}$. For example, when $T_b$−Average$(T_a)_{mean}$ is shorter than $T_s$ as shown in FIG. 2B, the status identifier can identify an incomplete status of the first backup operation at the point of time 206.

In one example, the first backup operation is stopped at a point of time 206 in response to a signal received by the backup agent 100. The signal may be an unexpected termination signal. In this example, the backup agent or the time period calculator 101 may monitor the first backup operation at regular time intervals to detect the signal. When $T_b$−Average$(T_a)_{mean}$ is shorter than $T_s$ and the signal is received by the backup agent, it may indicate that the first backup operation is incomplete at the point of time 206. In another example, when $T_b$−Average$(T_a)_{mean}$ is longer than $T_s$ and neither a terminal signal nor a completion signal is received by the backup agent, it may indicate that there is an overload on the network. In this situation, the backup agent may continue to monitor the first backup operation and may not start the second or the next backup operation.

Figure 3:
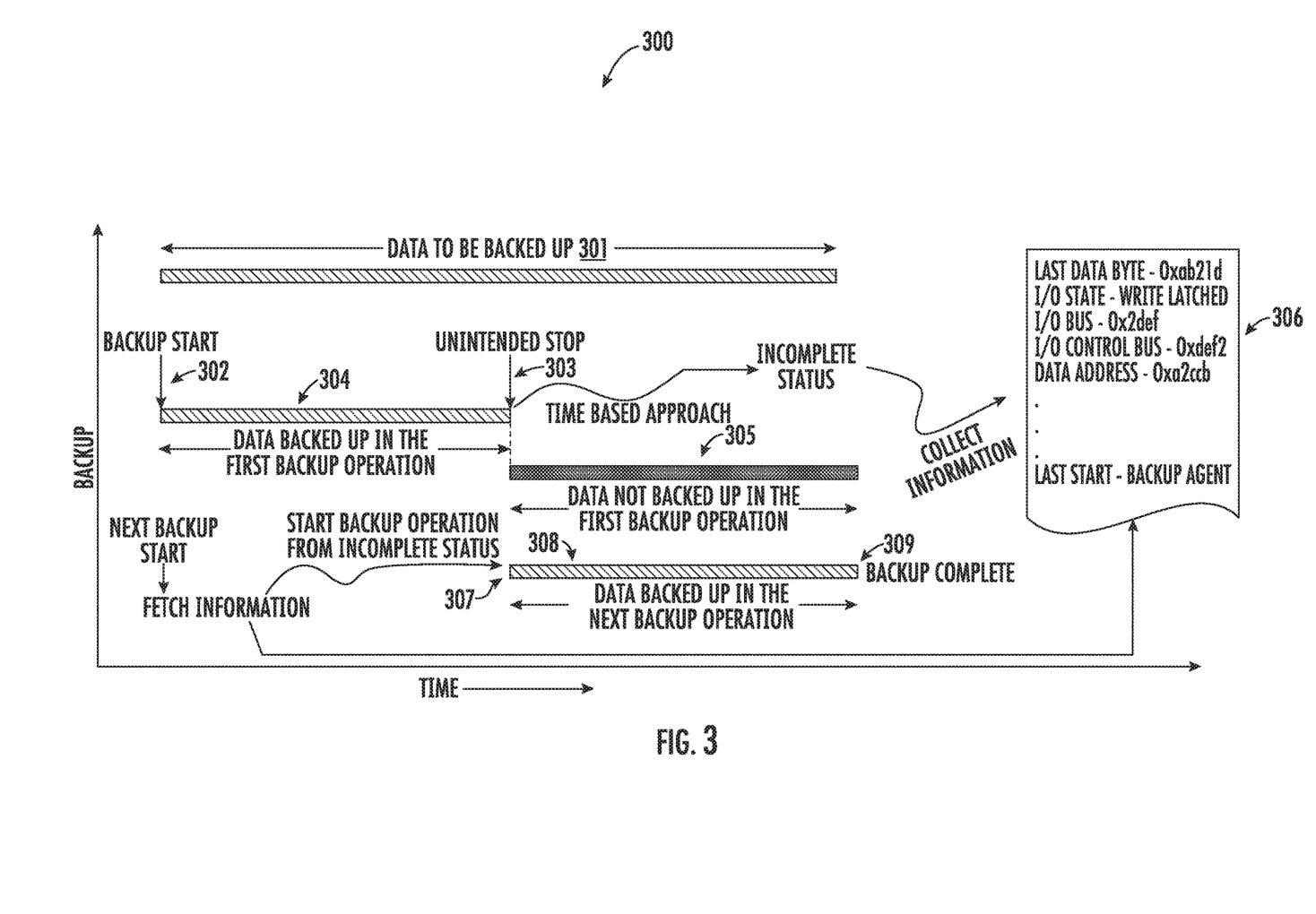
FIG. 3 illustrates a diagram illustrating backup operations for data packets by a backup agent, according to example implementations of the present disclosure.

FIG. 3 illustrates a diagram 300 illustrating backup operations for data packets by a backup agent, according to example implementations of the present disclosure. As shown, block 301 may indicate the data packets to be backed up. The first backup operation may start from a point of time 302 and may be stopped or interrupted at a point of time 303. The stop or interruption at the point of time 303 may be unintended or unexpected. The point of time 303 may correspond to the point of time 206 in FIG. 2B. Block 304 may indicate the data packets backed up in the first backup operation until the point of time 303, and block 305 may indicate the data packets not backed up in the first backup operation due to the unintended stop at the point of time 303.

In one example, the status identifier 102 can identify an incomplete status of the first backup operation at the point of time 303 using the time based approach as describe above. The information collector 103 can collect information describing the incomplete status of the first backup operation at the point of time 303. Block 306 may indicate the collected information describing the incomplete status of the first backup operation at the point of time 303. In one example, the collected information may include details such as client properties, source data properties, metadata byte entries, I/O mapped status, target device stream status, backup daemon status, last point of backup, last byte written and/or write operation status at the point of time 303.

In one example, when the next backup operation is initiated, the backup controller 104 may fetch the collected information from the information collector 103. The incomplete status of the first backup operation at the point of time 303 may be described by the collected information. Based on the collected information, the next backup operation may start from the incomplete status. For example, the data bytes from last written may be rewritten to the target device. In one example as shown in FIG. 3, the next or the second backup operation may start from a point of time 307, which may be the same as the point of time 303. In another example, the next or the second backup operation may start to back up the data packets in the block 305, i.e., the data packets not backed up in the first backup operation due to the unintended stop at the point of time 303. Block 308 may indicate data packets backed up in the second backup operation, which may be the same as the block 305. And the second backup operation may complete the backup of the data packets in the block 308 at a point of time 309. That is, the next or the second backup operation does not start over to back up the data packets in the block 304 that are already backed up in the first backup operation. Thus, backup of the data packets in the block 301 is not interrupted by the unintended or unexpected interruption at the point of time 303.

In one example, after the data packets in the block 301 are successfully backed up, the collected information describing the incomplete status of the first backup operation at the point of time 303 may be flushed from the cache memory. In another example, if during the next or the second backup operation, there is another unexpected interruption, a similar procedure can be applied to make the next or the second backup operation uninterrupted.

Figure 4:
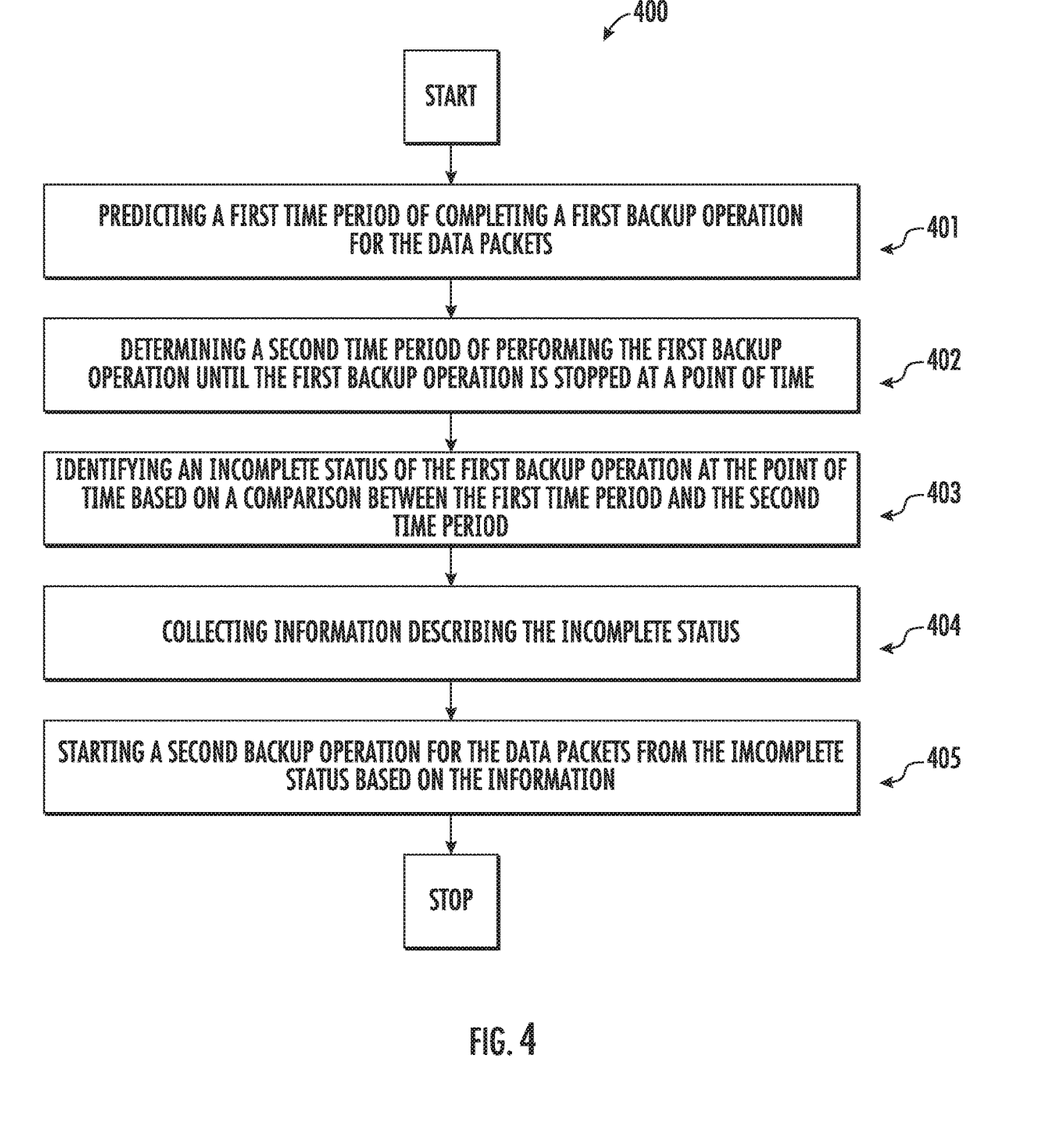
FIG. 4 is a flowchart illustrating various operations in a method of performing backup operations for data packets by a backup agent, according to example implementations of the present disclosure.

FIG. 4 is a flowchart illustrating various operations in a method 400 of performing backup operations for data packets by a backup agent 100, according to various example implementations. At block 401, the method includes predicting a first backup time period of completing a first backup operation for the data packets. At block 402, the method includes determining a second backup time period of performing the first backup operation until the first backup operation is stopped at a point of time. At block 403, the method includes identifying an incomplete status of the first backup operation at the point of time based on a comparison between the first backup time period and the second backup time period. At Block 404, the method includes collecting information describing the incomplete status. At block 405, the method includes starting a second backup operation for the data packets from the incomplete status based on the information.

According to example implementations of the present disclosure, the system 100 and its subsystems including the time period calculator 101, status identifier 102, information collector 103 and backup controller 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 5:
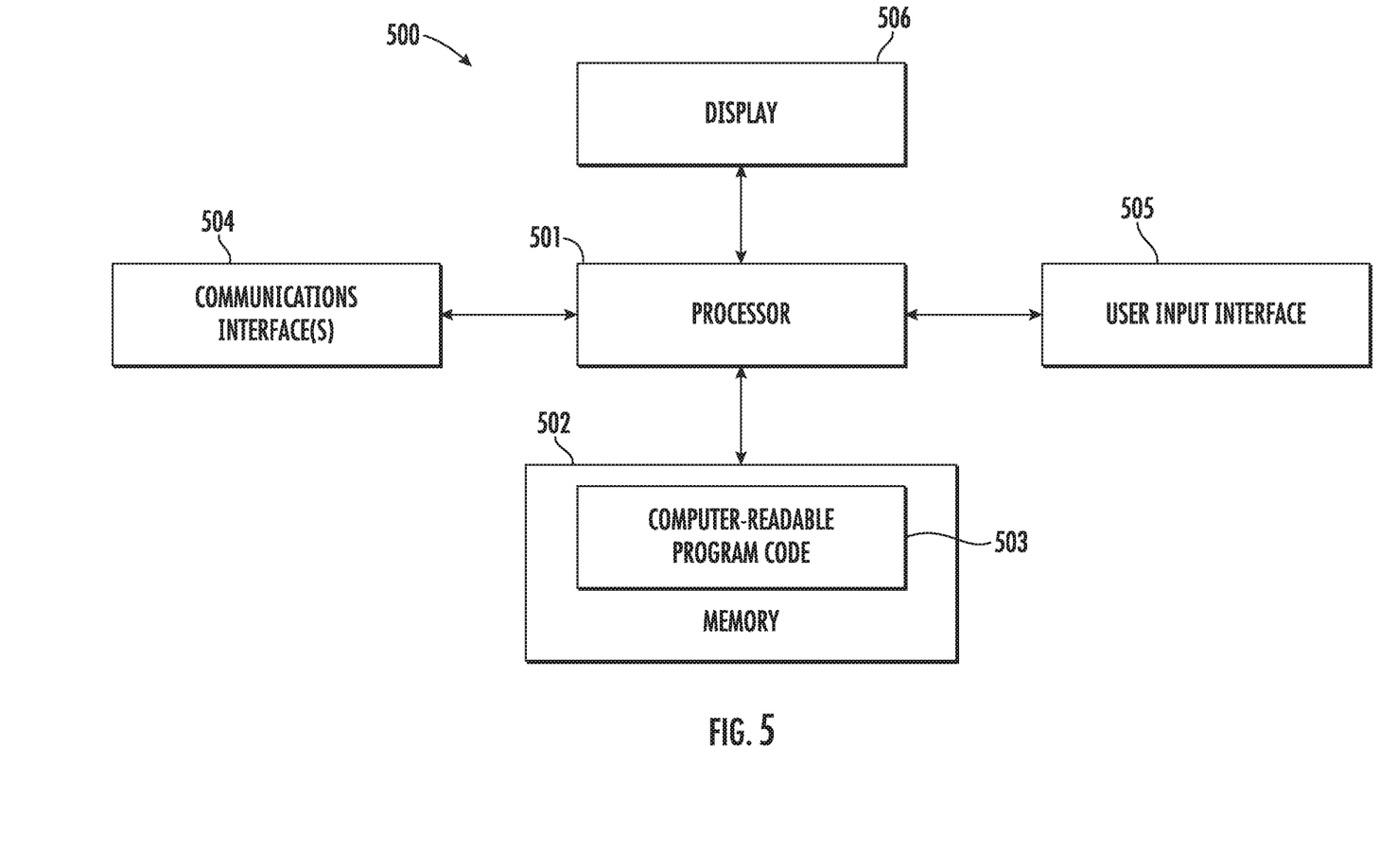
FIG. 5 illustrates an apparatus according to example implementations of the present disclosure.

FIG. 5 illustrates an apparatus 500 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 501 (e.g., processing circuitry) connected to a memory 502 (e.g., storage device). In some examples, the apparatus 500 implements the system 100.

The processor 501 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 502 (of the same or another apparatus).

The processor 501 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 502 is generally any piece of computer hardware that is capable of storing information such as, for example, data, computer programs (e.g., computer-readable program code 503) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 502, the processor 501 may also be connected to one or more interfaces for displaying, transmitting and/or receiving information. The interfaces may include a communications interface 504 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 506 and/or one or more user input interfaces 505 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 501 and a computer-readable storage medium or memory 502 coupled to the processor, where the processor is configured to execute computer-readable program code 503 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing backup operations for data packets by a backup agent, comprising:
    predicting a first backup time period of completing a first backup operation for the data packets by calculating an average arrival time of the data packets and an average completion time of completing the first backup operation to predict the first backup time period;
    during performing the first backup operation, monitoring the first backup operation at regular time intervals to detect a point in time when the first backup operation has stopped;
    upon detecting that the first backup operation has stopped, determining actual backup time period of performing the first backup operation until the first backup operation is stopped at a point of time;
    identifying an incomplete status of the first backup operation at the point of time based on a comparison between the first backup time period and the actual backup time period;
    collecting information describing the incomplete status; and
    based on the information, starting a second backup operation for the data packets not backed up in the first backup operation due to an unintended stop at the point of time.

2. The method of claim 1, wherein predicting the first backup time period includes predicting the first backup time period based on a difference between an average arrival time of the data packets and an average completion time of completing the first backup operation for the data packets.

3. The method of claim 2, wherein determining the actual backup time period includes determining the actual backup time period based on a difference between the actual average arrival time and the point of time.

4. The method of claim 1, wherein the first backup operation is stopped at the point of time in response to a signal received by the backup agent.

5. The method of claim 4, further comprising determining an overload when the actual backup time period is longer than the first backup time period prior to detecting the signal.

6. The method of claim 1, wherein identifying the incomplete status of the first backup operation includes identifying the incomplete status of the first backup operation when the actual backup time period is shorter than the first backup time period.

7. The method of claim 1, wherein the information describing the incomplete status is stored in a cache memory.

8. An apparatus for performing backup operations for data packets by a backup agent, the apparatus comprising a processor and a memory storing executable instructions that, in response to execution by the processor, cause the apparatus to:
predict a first backup time period of completing a first backup operation for the data packets by calculating an average arrival time of the data packets and an average completion time of completing the first backup operation to predict the first backup time period;
during the first backup operation, monitor the first backup operation at regular time intervals to detect a point in time when the first backup operation has stopped;
upon detection that the first backup operation has stopped, determine actual backup time period of performing the first backup operation until the first backup operation is stopped at a point of time;
identify an incomplete status of the first backup operation at the point of time based on a comparison between the first backup time period and the actual backup time period;
collect information describing the incomplete status; and
based on the information, start a second backup operation for the data packets not backed up in the first backup operation due to an unintended stop at the point of time.

9. The apparatus of claim 8, wherein the apparatus being caused to predict the first backup time period includes being caused to predict the first backup time period based on a difference between an average arrival time of the data packets and an average completion time of completing the first backup operation for the data packets.

10. The apparatus of claim 9, wherein the apparatus being caused to determine the actual backup time period includes being caused to determine the actual backup time period based on a difference between the average actual arrival time and the point of time.

11. The apparatus of claim 8, wherein the first backup operation is stopped at the point of time in response to a signal received by the backup agent.

12. The apparatus of claim 11, wherein the apparatus being caused to further determine an overload when the actual backup time period is longer than prior to detecting the signal.

13. The apparatus of claim 8, wherein the apparatus being caused to identify the incomplete status of the first backup operation includes being caused to identify the incomplete status of the first backup operation when the actual backup time period is shorter than the first backup time period.

14. The apparatus of claim 8, wherein the information describing the incomplete status is stored in a cache memory.

15. A computer-readable storage medium for performing backup operations for data packets by a backup agent, the computer-readable storage medium being non-transitory and having computer-readable program code stored therein that in response to execution by a processor, causes an apparatus to:
predict a first backup time period of completing a first backup operation for the data packets by calculating an average arrival time of the data packets and an average completion time of completing the first backup operation to predict the first backup time period;
during the first backup operation, monitor the first backup operation at regular time intervals to detect a point in time when the first backup operation has stopped;
upon detection that the first backup operation has stopped, determine actual backup time period of performing the first backup operation until the first backup operation is stopped at a point of time;
identify an incomplete status of the first backup operation at the point of time based on a comparison between the first backup time period and the actual backup time period;
collect information describing the incomplete status; and
based on the information, start a second backup operation for the data packets not backed up in the first backup operation due to an unintended stop at the point of time.

16. The computer-readable storage medium of claim 15, wherein the apparatus being caused to predict the first backup time period includes being caused to predict the first backup time period based on a difference between an average arrival time of the data packets and an average completion time of completing the first backup operation for the data packets.

17. The computer-readable storage medium of claim 16, wherein the apparatus being caused to determine the actual backup time period includes being caused to determine the actual backup time period based on a difference between the average actual arrival time and the point of time.

18. The computer-readable storage medium of claim 15, wherein the first backup operation is stopped at the point of time in response to a signal received by the backup agent.

19. The computer-readable storage medium of claim 18, wherein the apparatus being caused to further determine an overload when the actual backup time period is longer than the first backup operation prior to detecting the signal.

20. The computer-readable storage medium of claim 15, herein the apparatus being caused to identify the incomplete status of the first backup operation includes being caused to identify the incomplete status of the first backup operation when the actual backup time period is shorter than the first backup time period.

* * * * *